Dec. 4, 1934.                M. MÜCKLICH                1,983,238
                    ANTISKID TIRE FOR MOTOR VEHICLES
                          Filed Jan. 19, 1934
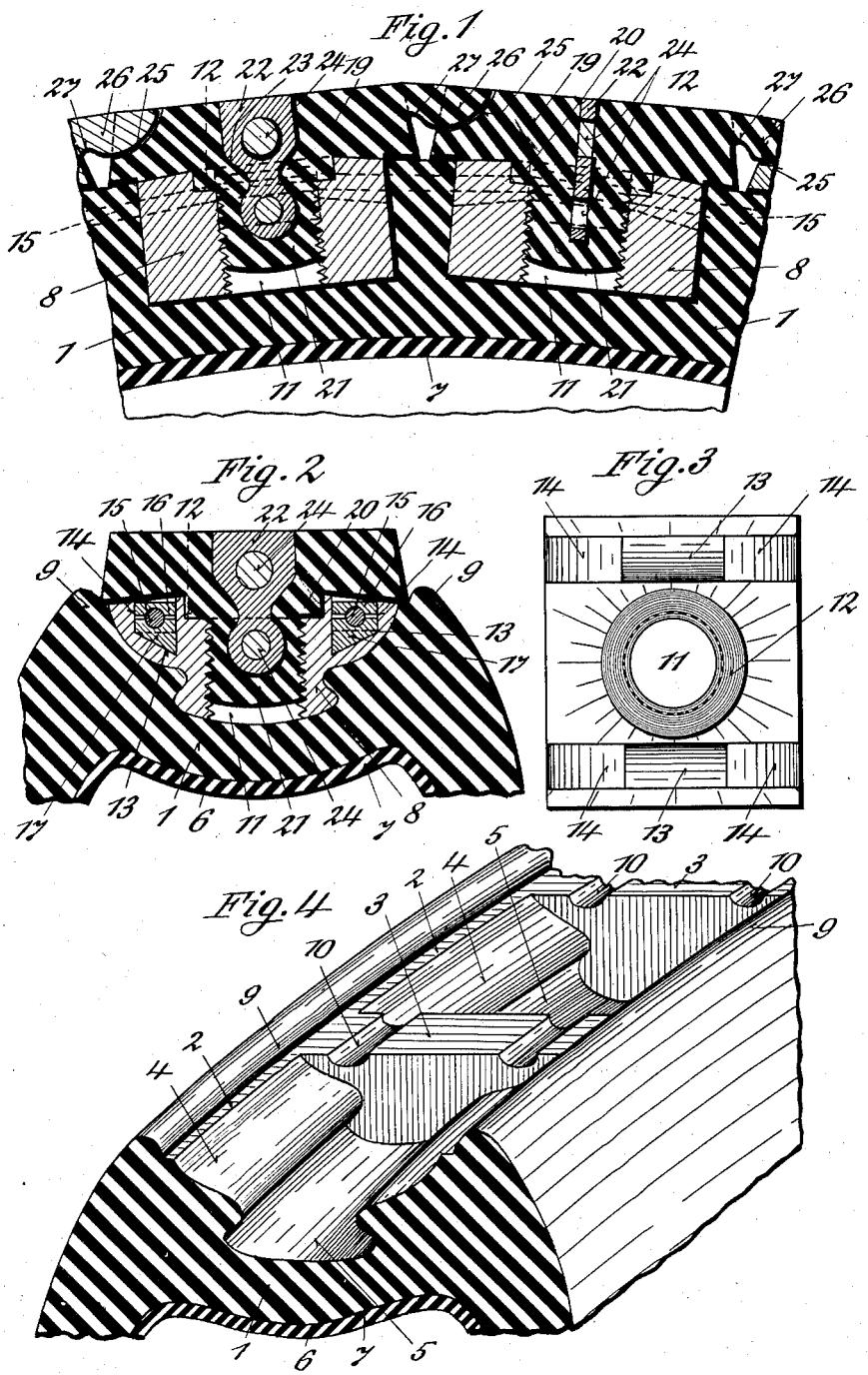

Patented Dec. 4, 1934

1,983,238

UNITED STATES PATENT OFFICE 1,983,238

ANTISKID TIRE FOR MOTOR VEHICLES

Max Mücklich, Dresden, Germany

Application January 19, 1934, Serial No. 707,325

8 Claims. (Cl. 152—16)

This invention relates to a non-slipping and anti-skidding tire for motor vehicles and motor cycles.

Endeavours have already been made, to fit metallic elements on the tread of pneumatic tires or to place either elastic or metallic rings in a recess formed in the tread.

None of the known solutions have given satisfaction because metallic elements or rings on asphalt or similar roads destroy the surface of the road and are themselves destroyed, apart from causing disagreeable noise, and as inserted rubber treads can only serve for saving the tire, but neither these nor the outer cover itself can produce an anti-slipping and anti-skidding effect.

An excellent effect is attained according to the invention in that in compartments formed in the tread of the outer cover metallic or other suitable hard elements of pressed material or the like are so embedded, that they are flush with the tread. As tread proper, however, large rubber blocks are employed which are screwed into internally threaded metal elements. Owing to the exchangeable tread elements the outer cover proper is not worn at all and moreover rubber blocks can be rapidly exchanged. These rubber blocks, in spite of their elasticity, have an excellent gripping and anti-skidding effect still further improved by steel wedges freely embedded in the rubber blocks and which, when the head portions of the rubber blocks are compressed, project slightly from the same but only so far that they reliably protect the vehicle against slipping on the road without, however, causing any damage to the road.

This result is due to the combination of an outer cover, the lower surface of which contacting with the rim is of arc-shaped convex cross section so that an annular channel is produced in the air tube and forms a soft resilient bed for the inserted metal elements and the elastic easily exchangeable rubber blocks together with the metallic steel elements projecting slightly only under pressure as they are freely embedded in the rubber blocks from the tread. The metal elements are held in that the recesses in the outer cover have a narrowed portion merging into a wider portion, in which the similarly shaped lower ends of the metal elements can be clamped or vulcanized, and also by known wire ropes placed in grooves in the metal elements. As the wire ropes, if loosely inserted, would wear in a very short time owing to the continuous movements of the metal elements, the arrangement and anchoring of the wire ropes is, according to the invention, of primary importance. The frictionless and reliable arrangement of the wire ropes is attained in that shoes in the shape of two-part blocks tightly clamp the ropes, these shoes being placed in recesses formed in the middle of the metal elements, and thus positively prevent creeping and even the slightest longitudinal shifting of the ropes. The necessary clearance for exposing the ropes is attained by inclining the bottom of the grooves towards their ends.

An embodiment of the invention is illustrated by way of example in the accompanying drawing in which:—

Fig. 1 shows a portion of the tire in longitudinal section.

Fig. 2 is a cross section of the tire.

Fig. 3 is a top plan view of a portion of the tire.

Fig. 4 shows in perspective view a portion of the outer cover.

The pneumatic tire will first be described. Compartments 2 are formed in the tread of the outer cover 1, the end walls of these compartments being formed by partitions 3 left standing, whereas the side walls extend from the top at an inwardly inclined concave surface 4, merging into a channel 5, the side walls of which are undercut. The lower surface 6 of the outer cover is of arc-shaped convex cross section so that an annular channel is formed in the air tube 7 and an elastic, soft bedding is produced for the metallic elements 8 pressed or embedded in the compartments 2. The outer cover has continuous annular beads 9 at the side edges and narrow longitudinal channels 10 in the partitions 3.

The metallic elements 8 have each a screw threaded central bore 11, widened at the top to form a shoulder 12, and two longitudinal channels 14 one at each side sloping towards the faces and provided each with a recess 13 at the middle. The top surface of the metal element 8 is slightly curved.

The metal elements 8 are held in position by wire ropes 15 on which holding blocks 16 having each a longitudinal channel in its lower surface are fixed at certain distances apart. The wedge-shaped lower portion 17 of each holding block is inserted in the recess 13 of the metal element 8 and is sunk in the corresponding longitudinal channel 14 so that a mutual support of the individual elements is obtained and the free portions of the wire rope 15 are nowhere subjected to friction.

The tread is formed of rubber blocks comprising a head 19, a neck 20 and a screw threaded shank 21. A steel core 22 cast in each rubber block extends into the screw-threaded shank 19 and it is freely embedded in elastic material.

The core is prevented from forcing its way into the rubber block by shoulder-like abutting surfaces 23 and holes 24. The under surface of the head of the rubber block is shaped to correspond to the upper curved surface of the metal element 8. The rubber blocks are screwed in the screw threaded bores 11, so that the neck 20 engages in the widened portion 12 and the head bears against the upper surface of the metal element. The head covers the channels 10 and partly the partitions 3 of two adjacent compartments 2. This head 19 of each rubber block has at one side a recess 25 and at the other side a tongue 26 having a throat 27 in its under side. The tongues 26 are held lifted when the rubber blocks are screwed into the metal elements and on being released engage with the recess of the adjacent rubber block head, so that a continuous tread is formed and the rubber blocks are secured against turning.

In the case of straight cross section outer covers metal elements with flat top surface corresponding to the cross section of the tire are chosen and reinforced by means of a plurality of the above mentioned rubber blocks of small dimensions. The fixation by the wire ropes remains the same.

I claim:—

1. A non-slipping and anti-skidding tire for motor vehicles and motor cycles, comprising in combination an outer cover having compartments formed in the tread thereof, metal elements secured in said compartments, rubber blocks having a screw threaded shank exchangeably screwed one into each of said metal elements, and a steel core freely embedded in each of said rubber blocks and extending into the shank thereof.

2. A tire as specified in claim 1, in which the compartments are formed by partitions left standing in the tread of the cover each of the side walls of each compartment forming a concave portion merging into a common undercut channel, and in which the lower surface of the cover is convex to form an annular recess in the air tube to obtain a soft yieldable bedding for the metal elements.

3. A tire as specified in claim 1, in which the metal elements are let into the compartments flush with the surface of the cover, each metal element having a conical upper surface, a screw-threaded central bore with a widening at the top end and two lateral channels sloping towards the end faces and each having a recess at the middle.

4. A tire as specified in claim 1, comprising in combination with the outer cover having compartments and undercut lateral grooves, and with the metal elements each having a central threaded bore with a widened top portion and channels one on each side, the bottom of each longitudinally extending channel sloping inwards from the outer side, a foot on each of said metal elements engaging in one of said compartments and into its undercut grooves, wire ropes extending through the longitudinally extending channels in said metal elements, two-part blocks composed of an upper straight part and of a lower wedge-shaped part clamped on to said ropes at distances apart, its wedge-shaped part engaging in the bottom portion of the corresponding lateral channel of the metal element to hold said ropes so that they do not bear against the walls of the channels in said metal elements and to prevent creeping of said ropes.

5. A tire as claimed in claim 1, in which each of the rubber blocks has a head with conically undercut under surface and a neck extending from this under surface.

6. A tire as claimed in claim 1, in which each of the steel cores has shoulder-like abutment faces and holes adapted to be filled with the rubber of the corresponding rubber block.

7. A tire as claimed in claim 1, in which the tire thread has lateral annular beads for laterally supporting the rubber blocks.

8. A tire as claimed in claim 1, in which each rubber block has a head with a recess at one end and a tongue with a throat at the other end.

MAX MÜCKLICH.